(12) United States Patent
Tientcheu-Yamdeu et al.

(10) Patent No.: US 10,208,748 B2
(45) Date of Patent: Feb. 19, 2019

(54) INSTALLATION FOR PUMPING HYDROCARBONS, MODULE AND METHOD

(71) Applicant: MOTEURS LEROY-SOMER, Angouleme (FR)

(72) Inventors: Mathias Tientcheu-Yamdeu, Angouleme (FR); Jean-Marie Andrejak, Saint Yrieix (FR); Ludovic Bourlier, Angouleme (FR); Daniel Ehanno, Angouleme (FR)

(73) Assignee: MOTEURS LEROY-SOMER, Angouleme (FR)

( * ) Notice: Subject to any disclaimer, the term of this patent is extended or adjusted under 35 U.S.C. 154(b) by 258 days.

(21) Appl. No.: 15/115,515

(22) PCT Filed: Jan. 21, 2015

(86) PCT No.: PCT/IB2015/050458
§ 371 (c)(1),
(2) Date: Jul. 29, 2016

(87) PCT Pub. No.: WO2015/114492
PCT Pub. Date: Aug. 6, 2015

(65) Prior Publication Data
US 2017/0159656 A1 Jun. 8, 2017

(30) Foreign Application Priority Data
Jan. 29, 2014 (FR) ..................................... 14 50686

(51) Int. Cl.
*H02P 27/06* (2006.01)
*F04C 14/08* (2006.01)
(Continued)

(52) U.S. Cl.
CPC ............ *F04C 14/08* (2013.01); *E21B 43/126* (2013.01); *F04B 17/03* (2013.01); *F04B 47/02* (2013.01);
(Continued)

(58) Field of Classification Search
CPC ...................................................... H02P 27/06
(Continued)

(56) References Cited

U.S. PATENT DOCUMENTS

| 4,728,808 A | 3/1988 | Bet-Esh et al. |
| 5,198,734 A | 3/1993 | Johnson |

(Continued)

FOREIGN PATENT DOCUMENTS

| EP | 0169756 A1 | 1/1986 |
| FR | 2891960 A1 | 4/2007 |

OTHER PUBLICATIONS

Apr. 24, 2015 International Search Report issued in International Patent Application No. PCT/IB2015/050458.
(Continued)

*Primary Examiner* — David Luo
(74) *Attorney, Agent, or Firm* — Oliff PLC

(57) ABSTRACT

The present invention concerns an installation for pumping hydrocarbons, including a pump submerged in a well and a motor for driving the pump, said motor being linked to a variable frequency drive powered during normal operation by an external network, the drive including a rectifier supplying a DC bus, an inverter supplied by the DC bus and linked to the motor, and a controller, said installation wherein it further includes an electricity storage element linked by a reversible DC-DC converter to the DC bus, the installation being arranged to ensure the variable frequency drive is supplied by the storage element in case of an interruption to the supply via the external network.

15 Claims, 2 Drawing Sheets

Figure 1:
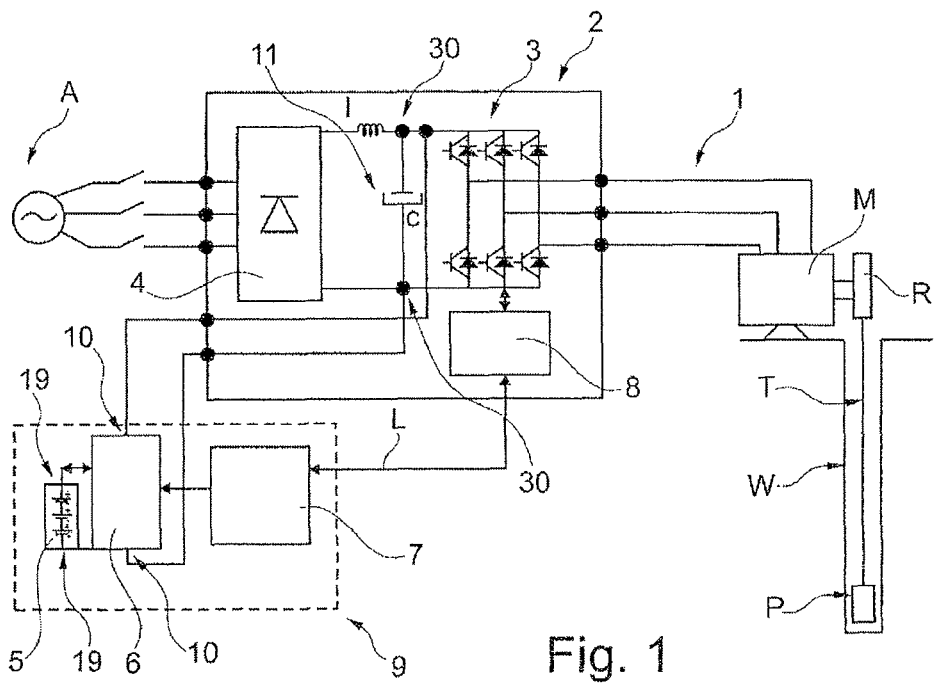

(51) Int. Cl.
- *F04B 17/03* (2006.01)
- *F04D 13/06* (2006.01)
- *F04B 47/02* (2006.01)
- *F04D 13/08* (2006.01)
- *E21B 43/12* (2006.01)
- *F04C 2/107* (2006.01)
- *F04C 14/28* (2006.01)
- *F04C 15/00* (2006.01)
- *H02J 9/06* (2006.01)

(52) U.S. Cl.
CPC .......... *F04C 2/1071* (2013.01); *F04C 14/28* (2013.01); *F04C 15/008* (2013.01); *F04D 13/06* (2013.01); *F04D 13/068* (2013.01); *F04D 13/08* (2013.01); *H02P 27/06* (2013.01); *F04C 15/0061* (2013.01); *H02J 9/062* (2013.01); *H02P 2207/01* (2013.01)

(58) Field of Classification Search
USPC .................................................. 318/3, 34
See application file for complete search history.

(56) References Cited

U.S. PATENT DOCUMENTS

| | | | |
|---|---|---|---|
| 5,234,319 A | 8/1993 | Wilder | |
| 7,116,067 B2* | 10/2006 | Ma | H02P 6/08 318/400.05 |
| 7,202,619 B1* | 4/2007 | Fisher | F04D 15/0066 318/400.29 |
| 7,330,779 B2 | 2/2008 | Schulz | |
| 7,607,896 B2* | 10/2009 | Leuthen | H02H 7/1222 417/44.1 |
| 9,140,253 B2 | 9/2015 | Wentworth et al. | |
| 9,617,990 B2 | 4/2017 | Graybill | |
| 2005/0281681 A1 | 12/2005 | Anderson et al. | |
| 2011/0050144 A1 | 3/2011 | Knox et al. | |
| 2011/0103974 A1 | 5/2011 | Lamascus et al. | |
| 2014/0322049 A1 | 10/2014 | Graybill | |

OTHER PUBLICATIONS

Apr. 24, 2015 Written Opinion issued in International Patent Application No. PCT/IB2015/050458.

* cited by examiner

INSTALLATION FOR PUMPING HYDROCARBONS, MODULE AND METHOD

The present invention relates to installations for pumping hydrocarbons.

The invention relates more particularly to installations for pumping hydrocarbons comprising, for example, a progressive cavity, centrifugal or beam pump, submerged in a well and driven by a motor from the surface of the well via a pump drive rod, this motor being connected to a variable frequency drive powered in normal operation by an external network.

Such pumps in normal operation store a potential energy in two forms, namely a torsion energy in the pump drive rod which twists on itself and a hydrostatic energy corresponding to the column of fluid in the well.

In case of failure of the electrical supply to the motor, notably from a power supply failure, this potential energy is likely to result in sharply driving the pump drive rod in reverse rotation at high speed (phenomenon of "backspin") and may cause a runaway, the consequences of which may be dangerous for people and equipment. It is then necessary to wait until the fluid levels are balanced in the wells to restart the pumping, leading to a significant loss of production.

US Patent Application 2011/050144 discloses a reverse rotation detection system.

U.S. Pat. No. 5,234,319 discloses a power supply system for a pumping system comprising a battery powered by a charger, this power supply system being interposed between the rectifier output and the inverter input.

U.S. Pat. No. 4,728,808 discloses an uninterruptible power supply system comprising batteries connected between a DC-DC converter and a charger.

EP Patent Application 0169756 discloses a method for stopping reverse rotation by supplying the pump motor with a DC current.

U.S. Pat. No. 5,198,734 discloses a stabilized electrical power supply device, comprising a battery associated with a battery charger connected to the network.

FR Patent Application 2891960 discloses a switching system that makes it possible, in case of network failure and in a situation where the output shaft of the motor is driven in reverse rotation, to evacuate the electrical energy generated by the motor to a dissipative load. This solution is usable only if the pump's electric motor is the synchronous type, which is the case only for a very small proportion of installed systems. With asynchronous induction motors, which means the overwhelming majority of cases, the remnant voltage essential to such braking in a passive load disappears in a few hundred milliseconds.

US Patent Application 2005/0281681 A1 describes a system in which the motor is driven by a variable speed drive, which in case of the loss of the power supply network, recovers the kinetic and potential energy stored in the motor and the pumped fluid column during normal operation to continue to be powered and to control the speed of the pump at a low value. This operation is problematic because of the random nature of the very conditions of existence of this recoverable mechanical energy.

To be able to recover energy from the rotating parts and continue the power supply of the variable drive, certain mechanical conditions must be met: notably this energy must be greater than the losses of the entire system downstream of the variable drive (pump, pipe, etc.). According to the state of the well and operating conditions, notably the rotation speed of the motor at the time of the power failure, these conditions may not be met and continuity of operation is therefore not assured.

Even when the mechanical conditions above are met, continuity of operation requires very rapid switching from a normal operating mode where the variable drive powers the pump motor to an operating mode where a part of the energy is recovered from the mechanical parts for powering the variable drive, as pumping is no longer assured. This switching does not always succeed in view of its complexity.

Finally, if the network failure occurs at a time when this mechanical energy is not recoverable, or if there is a failure in this mechanical energy recovery operation, the phenomenon of backspin is likely to occur.

The invention aims, inter alia, to provide a solution ensuring greater operating availability of installations for pumping hydrocarbons by aiming to make them immune to the disruptions of electrical networks. The invention reduces the risk of backspin, and by improving continuity of operation, minimizes operating losses.

Thus the subject matter of the invention, according to a first of its aspects, is an installation for pumping hydrocarbons, comprising a pump submerged in a well and a motor for driving the pump, this motor being connected to a variable frequency drive powered in normal operation by an external network, the variable drive comprising a rectifier supplying a DC bus, an inverter powered by the DC bus and connected to the motor and a controller, and the installation is characterized by the fact that it further comprises an electricity storage element connected via a reversible DC-DC converter to the DC bus, the installation being arranged for ensuring the power supply of the variable frequency drive by the storage element in case of disruption of the power supply via the external network.

Thanks to the invention, there is an uninterrupted power supply to the pump, at a relatively low cost, since the same variable frequency drive is used both in case of normal operation of the network, usually three-phase, and in case of network failure by drawing energy from the storage element. In addition, the invention avoids the use of a UPS upstream of the rectifier for replacing the network in the event of the latter's failure, this device being particularly costly given that the UPS must be dimensioned for delivering all the power of the DC motor variable drive, while the energy storage element in the context of the invention is only dimensioned with respect to the desired autonomy, for durations typically not exceeding a few minutes, resulting in an optimization of the cost/function ratio. Likewise, a power supply system interposed between the rectifier and the inverter, as described by U.S. Pat. No. 5,234,319, forms part of a UPS and does not allow dimensioning the storage element solely with respect to the desired autonomy.

The invention also makes the installation's operation more reliable.

Disruption of the network refers, for example, to a loss of network or an instability in the network voltage and/or phase.

The storage element comprises, for example, at least one battery or one supercapacitor. "Battery" refers to one or more accumulator stages in series and/or in parallel.

Preferably, the variable drive has terminals for accessing the DC bus and a bus for data exchange with the outside, notably for transmitting an item of information concerning the state of the network power supply and the exchange of operating parameters of the inverter and/or of the motor.

Preferably, the installation comprises a control system for the reversible DC-DC converter, exchanging data with the variable drive via the data exchange bus.

The invention makes optimal production possible by almost complete elimination of detrimental effects due to power supply network losses, since the pumping operation continues at a speed optimized according to all the available information concerning the state of the network and the installation.

The variable drive may comprise multiple speed setpoints already programmed in a memory therein.

As a variant, these setpoints may be contained in an external element, e.g. a USB key card or SD memory card, which may be directly or indirectly connected to the control system and/or to the data exchange bus of the variable drive.

The variable drive may be arranged, in case of disruption of the external network, for selecting a speed setpoint from those already programmed. Thus, the installation may be easily configured for following a predefined operation in case of interruption in the network power supply. The selection may be performed on the basis of at least one item of information transmitted by the control system. For example, the information from the control system depends on the charge state of the storage element.

Preferably, in normal operation, the controller calculates a charge current limit for the DC-DC converter according to the inverter output current on the motor side for avoiding an overload of the rectifier, the latter delivering the current for the motor and the charge current of the storage element, and communicates this limit to the control system.

As a variant, the controller may transmit the information concerning the load level of the motor directly to the control system, and the calculation of the DC-DC converter current limit may be performed by the control system, which subsequently adapts the charge current of the storage element.

Preferably, in case of disruption of the network, the control system sets a voltage value at the DC bus terminals preventing the variable drive from tripping the DC bus undervoltage safety.

The subject matter of the invention is also an external safety module for an installation for pumping hydrocarbons comprising a pump submerged in a well, driven by an electric motor connected to a variable drive powered by the external network, this variable drive comprising a DC bus between a rectifier connected to the network and an inverter, and a controller, the variable drive comprising terminals for accessing the DC bus and a bus for data exchange with the outside, for transmitting information relating to the state of the external network and receiving a speed setpoint. The module comprises an electrical energy storage element, a reversible DC-DC converter and a control system for the converter, terminals to connect to the DC bus of the variable drive and a bus for communication with the variable drive for ascertaining the state of the network and transmitting to the variable drive at least one item of useful information for selecting a speed setpoint in case of emergency operation during a disruption of the network and/or for informing the variable drive of the charge state of the storage element.

The module may be optionally added to an existing installation for which it has not been initially designed, since the terminals of the variable drive's DC bus are accessible and it is provided with an interface for communication with an external piece of equipment, comprising a data exchange bus.

The module makes it possible to implement a pumping installation according to the invention.

Further subject matter of the invention is a method for managing the power supply of an electric motor for driving a pump for pumping hydrocarbons, submerged in a well, belonging to an installation according to the invention, in which in case of disruption of the external network, notably of interruption thereof, the DC bus of the variable drive is powered by the storage element via the DC-DC converter, so as to control the rotation of the motor, notably in order to avoid reverse rotation or for maintaining the pumping at a reduced speed, and in case of normal power supply by the network, the same DC-DC converter is used for recharging the storage element.

Preferably, the control system is informed of the load level of the motor so as not to overload, according to the power of the pump, the rectifier feeding the DC bus in case of normal operation of the network.

Preferably, the variable drive is informed of the charge state of the storage element, in case of disruption of the network and when the charge state of the storage element is lower than a given threshold, the motor is brought into operation in the opposite direction so as to collect the mechanical energy.

Figure 2A:
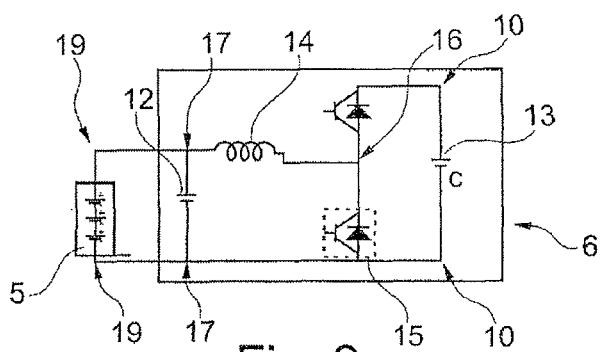
Figures 2B, 2C:
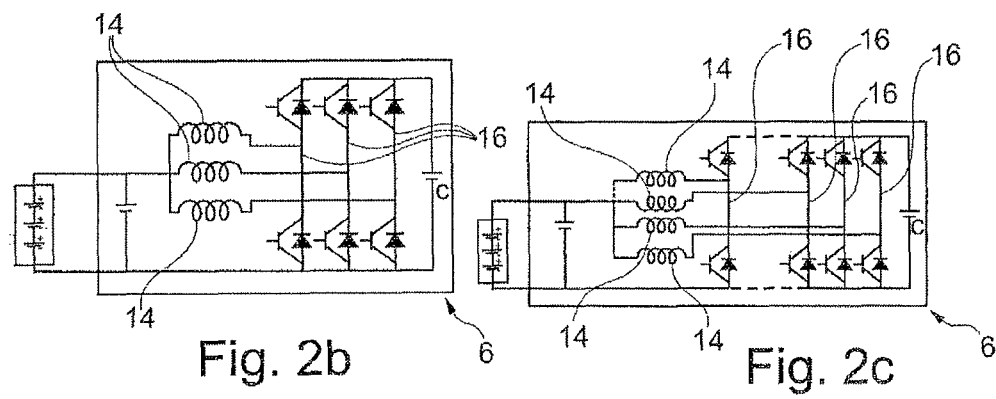
Figure 3:
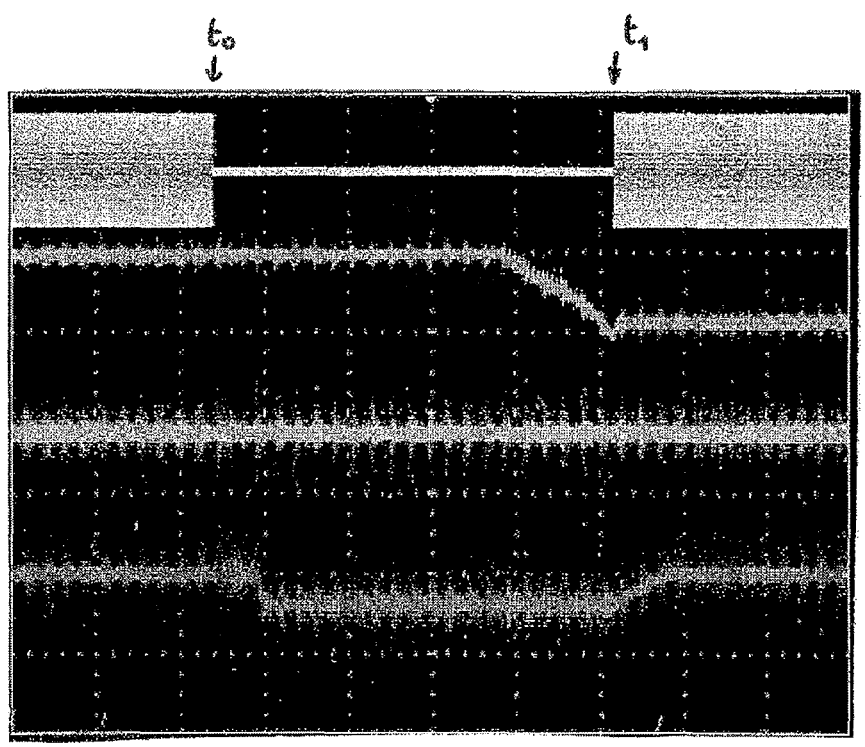

The invention may be better understood on reading the following detailed description of non-restrictive implementations thereof, and on examining the accompanying drawing, in which:

FIG. 1 is a schematic view of an example of an installation according to the invention, FIGS. 2a-2c are examples of reversible DC-DC converters, and, FIG. 3 illustrates a test performed with an external module according to the invention.

FIG. 1 schematically represents an oil well W at the bottom of which a pump P is submerged, preferably a progressive cavity pump, driven by a motor M from the surface, via a drive rod T and a speed reducer R, notably a geared reducer.

A fluid column with a dynamic level is retained in the well W by pumping.

A variable frequency drive 2 comprises a rectifier 4, e.g. a diode or power transistor rectifier for "proper" variable drives, connected to an external electrical network A, and an inverter 3 connected to the motor M. The rectifier 4 supplies a DC bus 11 on which a capacitor C, e.g. a polarized capacitor, and optionally, as illustrated, a line inductor I for reducing harmonic currents, is connected.

The DC bus 11 in its turn powers the inverter 3 in case of normal operation, i.e. in the presence of network A.

The power supply network A is, for example, three-phase, notably 400 V, 575 V or 690 V+/−10% and between 50 or 60 Hz. As a variant, the power supply network A may be polyphase with more than three phases.

The inverter 3 is, for example, an IGBT (Insulated Gate Bipolar Transistor) three-phase, autonomous type, notably operating in "Pulse Width Modulation" (PWM), with direct torque control (DTC) or any other technique for powering an electric motor with variable voltage and frequency from a DC source.

The variable drive 2 also comprises a variable drive controller 8. This controller is, for example, in the form of an electronic control board.

The variable drive controller 8 comprises, for example, a control unit supplying driving commands to the IGBTs or to other suitable types of transistors, according to instructions supplied by the operator (run command, operating direction, speed setpoint) and the measurement of electrical quantities (network voltage, motor current).

In the example of an installation according to the invention illustrated in FIG. 1, an external safety module 9 is connected to the variable frequency drive 2. This module 9 comprises a reversible DC-DC converter 6, the terminals 11 of which are connected to the terminals 30 of the DC bus 11 of the inverter 3, and an electricity storage element 5 connected to the DC-DC converter 6.

The module 9 also comprises a control system 7 for the converter 6 and a bus for communication with the variable drive 2, for an exchange of data via the wired or wireless link L.

The control system 7 is, for example, in the form of an electronic board. In the event that the controller 8 of the variable drive 2 is also in the form of an electronic board, the control system 7 and the controller 8 may be two separate boards or as a variant, belong to the same board.

In addition to controlling the converter 6, the control system 7 may be arranged for processing the data exchanged with the variable drive 2. In the example considered, it is the controller 8 of the variable drive 2 that first has the information on the presence or absence of the network A and not the control system 7 which has no link with the network A. The control system 7 has information on the charge state of the storage element 5 and the corresponding amount of energy available, which is used by the controller 8 to choose its speed setpoint in degraded mode, preferably in a list of setpoints pre-programmed according to the wells W.

As a variant, the processing of the data from the safety module 9 and/or the variable drive 2 may be performed by the controller 8 of the variable drive 2, or again, jointly, by a processing system different from both the control system 7 and the controller 8. In the latter case, the control system 7 and the controller 8 provide the respective commands of the converter 6 and the variable speed drive 2, in response to the signals sent by said processing system. Such an external supervisor is especially relevant when the decisions to be taken depend on other information on the complete system and of which none of the controllers is aware, e.g. presence of an API (Application Programming Interface) for overall management.

In the presence of network A, the variable drive 2 ensures both the function of supplying power to the motor M for pumping, and recharging the storage element 5 with electricity, ideally charged to its maximum energy storage capacity, via the reversible DC-DC converter 6 which then operates, for example, in step-down voltage. The energy used to supply the motor M passes through the rectifier 4 and the inverter 3. The energy used to charge the storage element 5 passes through the rectifier 4 and the DC-DC converter 6: the controller 8 indicates to the control system 7 the load level of the motor and the control system 7 adapts the charge current of the storage element 5 so as not to overload the rectifier 4.

Typically, this charging is performed as long as the network A is present and the maximum capacity of the system 9 is not reached.

In case of disruption of the network 4, detected upstream of the variable drive 2 and/or in the DC bus 11, the reversible DC-DC converter 6 recovers electrical energy from the storage element 5 for supplying the DC bus 11 of the inverter 3 at the same time that the inverter 3 changes from a "pumping in normal operation" mode to an "operation in the absence of the power supply network" mode.

This last mode may be either maintaining the fluid column at a standstill or at a very low speed of descent, or continuing operation, where pumping is operated at a pre-established speed setpoint, preferably lower than the setpoint of normal operation to minimize energy consumption and thus optimize the duration of operation in this mode independent of the power supply network A.

The exchange of information between the safety module 9 and the variable drive 2 ensures the adaptation of voltages and frequency at the output of the variable drive 2 and/or the voltage or current setpoints of the reversible DC-DC converter 6 according to all the information (state of the network A, charge state of the storage element 5, speed setpoint and voltage of the DC bus in case of absence of the network, etc). Thus, in a robust manner, either the weight of the column may be maintained at a standstill, or the pumping operation continued at low speed under the various operating modes of the inverter 2, as the operator of the well W wishes.

The voltage at the output of the variable drive 2 in "pumping in normal operation" mode is, preferably, between 0 and the voltage of the power supply network according to the speed setpoints of the well operator and according to the characteristics of the motor (compliance with the voltage/frequency law). The frequency or voltage in "operation in the absence of the power supply network" is, for example, in case of continuing pumping at low speed, between 5 and 20% approximately of the frequency or nominal voltage, notably of the order of 0 to 5% in case of a standstill of the column, depending on the height of the fluid column pumped in the well W.

The voltage at the terminals of the storage element 5 is in general between a few volts and preferably approximately 300-400 V which it reaches when the storage element 5 is charged to its maximum capacity.

When the voltage at the terminals of the storage element passes below a critical threshold predefined by adjustment and announcing the imminent exhaustion of the stored energy, if it continues to be drawn on, a low speed setpoint in the opposite direction to the direction of normal pumping is chosen by the variable drive, which leads the pump motor to operate as a generator, notably asynchronously, which makes it possible, if the conditions of the well allow it, to recover mechanical energy and thus prolong the duration of operation in the absence of the network. This change in direction of energy transfer, which only takes place within the scope of the invention as a last resort when the stored energy is almost exhausted, is made easier here unlike the conventional solution by the presence of a storage element. This is because one of the difficulties of the solution provided by US Patent 2005/0281681 A1 is just to carefully manage the energy to be recovered without tripping an overvoltage fault in the variable drive.

The invention is not restricted to the previously described embodiment.

For example, the inverter 3 of the variable drive may be other than with IGBT transistors.

The module 9 comprising the DC-DC converter 6 and the storage element 5 may not be a module external to the variable drive 2. This module 9 may, for example, form an integral part of the electrical circuit of the variable drive 2 from the manufacture of the latter.

The motor M may operate as a generator in case of the pump being braked, notably in case of the well W being emptied. In this case, the energy supplied by the motor M may be recovered by the variable drive 2 and returned to the DC-DC converter 6 for recharging the storage element 5. If well operation contains this type of sequence, the system will take advantage of it to recover the energy for charging the storage element instead of drawing energy from the network: the gain is the saving in charging energy.

The reversible DC-DC converter 6 may be implemented in various ways.

The converter 6 may be a simple single-arm converter as represented in FIG. 2a. The converter comprises two DC buses 12 and 13 comprising capacitors. The respective terminals 10 and 17 of the DC buses 12 and 13 are connected respectively to the terminals 19 and 30 of the storage element 5 and the DC bus 11.

The DC buses 12 and 13 are connected by a bridge comprising an arm 16 formed by two electronic switches 15, and a smoothing inductor 14 connecting the arm 16 to the + terminal of the capacitor 12. The electrical switches 15 may be of the IGBT, bipolar, MOSFET, etc. type.

As a variant, the converter 6 may be three-phase as in FIG. 2b, with the DC buses 12 and 13 connected by a bridge comprising three interleaved arms 16, each arm 16 being connected to the +terminal of the capacitor 12 by a smoothing inductor 14.

More generally, as illustrated in FIG. 2c, the DC-DC converter 6 may be one with multiple interleaved arms 16, notably for optimizing the size of the smoothing inductors 14.

Of course, other types of reversible DC-DC converters providing a DC-DC reversible conversion function may be used without departing from the scope of the present invention.

EXAMPLE

A test conducted with an external module according to the invention is described below.

In this test, the motor used has a power of approximately 90 kW. The storage element comprises a 160 V supercapacitor module. FIG. 3 illustrates the result of this test.

From top to bottom:

The first curve represents the network voltage upstream of the variable frequency drive, which is 400 V effective.

The second curve represents the voltage at the terminals of the storage element.

The third curve represents the DC voltage at the terminals of the inverter that supplies the motor. This voltage is 580 V.

The fourth and last curve represents the rotation speed of the motor.

These curves are drawn from the instant when the network is operating normally, followed by a network disruption of approximately 25 seconds, until an instant later after the reappearance of the network.

At the start of the plot, the variable drive powers the motor which rotates at a normal operating speed of 1000 rpm in this example.

At time $t_0$ of the disappearance of the network, visible on the upstream voltage measurement represented by the first curve, the DC-DC converter is controlled so as to draw energy from the storage element for continuing the power supply of the DC bus which accordingly, has a voltage at the terminals that remains constant, as illustrated by the third curve.

During this phase of disappearance of the network, the speed of the motor is reduced and maintained at a level for minimizing the absorbed power so as to increase the autonomy.

As it is the storage element which supplies the energy after the disappearance of the network, this is expressed in a drop in the voltage at its terminals, visible on the second curve. The voltage at the terminals of the storage element has passed from 100 V at the beginning of the phase of disappearance of the network to 50 V at the end of this phase, as illustrated by the second curve. At time $t_1$ of the reappearance of the network, the storage element no longer supplies the energy then provided by the network, which stabilizes its voltage, as illustrated by the end of this second curve.

The speed of the motor is then restored, e.g. with a programmable ramp, to its setpoint before disruption, as may be seen at the end of the last curve.

Throughout the disruption in this recording, the motor has not ceased to be powered.

Of course, motors of a different power or networks of a different effective voltage may be used.

A storage element of different voltage may be chosen according to the power supply requirement.

The invention claimed is:

1. An installation for pumping hydrocarbons, comprising:
a pump submerged in a well;
a motor for driving the pump, this motor being connected to a variable frequency drive powered in normal operation by an external network, the variable drive comprising:
a controller,
a rectifier supplying a DC bus, and
an inverter powered by the DC bus and connected to the motor and the controller; and
an electricity storage element connected via a reversible DC-DC converter to the DC bus, the installation being arranged for ensuring the power supply of the variable frequency drive by the storage element in case of disruption of the power supply via the external network.

2. The installation as claimed in claim 1, the storage element comprising at least one battery or one supercapacitor.

3. The installation as claimed in claim 1, the variable drive having a bus for data exchange with the outside for transmitting an item of information concerning the state of the network power supply and the exchange of operating parameters of the inverter and/or the motor.

4. An installation for pumping hydrocarbons, comprising:
a pump submerged in a well;
a motor for driving the pump, this motor being connected to a variable frequency drive powered in normal operation by an external network, the variable drive comprising:
a controller,
a rectifier supplying a DC bus, and
an inverter powered by the DC bus and connected to the motor and the controller; and
an electricity storage element connected via a reversible DC-DC converter to the DC bus, the installation being arranged for ensuring the power supply of the variable frequency drive by the storage element in case of disruption of the power supply via the external network,
wherein the variable drive has terminals for accessing the DC bus and a bus for data exchange with the outside, and the installation further comprises a control system for the reversible DC-DC converter, the control system exchanging data with the variable drive via the data exchange bus.

5. The installation as claimed in claim 4, the variable drive comprising multiple speed setpoints already programmed in a memory therein.

6. The installation as claimed in claim 5, the variable drive being arranged, in case of disruption of the external network, for selecting a speed setpoint from those already programmed.

7. The installation as claimed in claim 6, the selection being performed on the basis of at least one item of information transmitted by the control system.

8. The installation as claimed in claim 7, the information from the control system depending on the charge state of the storage element.

9. The installation as claimed in claim 4, in which, in case of disruption of the network, the control system sets a voltage value at the DC bus terminals preventing the variable drive from tripping the DC bus undervoltage safety.

10. The installation as claimed in claim 4, in which, in case of normal supply of the network, the controller calculates a current limit for the DC-DC converter according to the inverter output current on the motor side for avoiding an overload of the rectifier, the latter delivering the current for the motor and the charge current of the storage element, and communicating this limit to the control system.

11. An external safety module for an installation for pumping hydrocarbons comprising a pump submerged in a well, driven by an electric motor connected to a variable drive powered by the external network, this variable drive comprising a rectifier supplying a DC bus, an inverter powered by the DC bus and connected to the motor, and a controller, the variable drive comprising terminals for accessing the DC bus and a bus for data exchange with the outside, for transmitting information relating to the state of the external network and receiving a speed setpoint, the module comprising an electrical energy storage element, a reversible DC-DC converter and a control system for the converter, terminals to connect to the DC bus of the variable drive and a bus for communication with the variable drive for ascertaining the state of the network and transmitting to the variable drive at least one item of useful information for selecting a speed setpoint in case of emergency operation during a disruption of the network and/or for informing the variable drive of the charge state of the storage element.

12. A method for managing the power supply of an electric motor for driving a pump for pumping hydrocarbons, submerged in a well, belonging to an installation for pumping hydrocarbons, comprising:
 a pump submerged in a well;
 a motor for driving the pump, this motor being connected to a variable frequency drive powered in normal operation by an external network, the variable drive comprising:
  a controller,
  a rectifier supplying a DC bus, and
  an inverter powered by the DC bus and connected to the motor and the controller; and
 an electricity storage element connected via a reversible DC-DC converter to the DC bus, the installation being arranged for ensuring the power supply of the variable frequency drive by the storage element in case of disruption of the power supply via the external network, the method comprises:
 in case of disruption of the external network,
  powering the DC bus of the variable drive by the storage element via the reversible DC-DC converter, so as to control the rotation of the motor, and
 in case of normal power supply by the network,
  recharging the storage element via the converter.

13. The method as claimed in claim 12, in which the control system is informed of the load level of the motor so as not to overload, according to the power of the pump, the rectifier feeding the DC bus in case of normal operation of the network.

14. The method as claimed in claim 12, in which the variable drive is informed of the charge state of the storage element, in case of disruption of the network and when the charge state of the storage element is lower than a given threshold, the motor is brought into operation in the opposite direction so as to collect the mechanical energy.

15. The method as claimed in claim 12, the DC bus of the variable drive is powered by the storage element via the reversible DC-DC converter in order to avoid reverse rotation or for maintaining the pumping at a reduced speed.

* * * * *